US006735448B1

(12) United States Patent
Krishnamurthy et al.

(10) Patent No.: US 6,735,448 B1
(45) Date of Patent: May 11, 2004

(54) POWER MANAGEMENT FOR THROUGHPUT ENHANCEMENT IN WIRELESS AD-HOC NETWORKS

(75) Inventors: Srikanth Krishnamurthy, Riverside, CA (US); Tamer ElBatt, Woodland Hills, CA (US); Dennis Connors, Mariposa, CA (US)

(73) Assignee: HRL Laboratories, LLC, Malibu, CA (US)

( * ) Notice: Subject to any disclaimer, the term of this patent is extended or adjusted under 35 U.S.C. 154(b) by 238 days.

(21) Appl. No.: 09/708,271

(22) Filed: Nov. 7, 2000

(51) Int. Cl.⁷ .................................................. H04Q 7/20
(52) U.S. Cl. ........................ 455/522; 455/445; 370/318
(58) Field of Search ........................... 455/522, 70, 69, 455/575, 445; 370/312, 313, 315, 318, 445

(56) References Cited

U.S. PATENT DOCUMENTS

| 4,670,906 | A |   | 6/1987  | Thro                      |
|-----------|---|---|---------|---------------------------|
| 5,450,616 | A | * | 9/1995  | Rom ..................... 455/69 |
| 5,553,316 | A | * | 9/1996  | Diepstraten et al. ........ 370/445 |
| 5,564,075 | A | * | 10/1996 | Gourgue ...................... 455/69 |
| 5,933,425 | A | * | 8/1999  | Iwata ......................... 370/351 |
| 5,949,760 | A | * | 9/1999  | Stevens et al. ............. 370/254 |
| 6,097,703 | A | * | 8/2000  | Larsen et al. ............... 370/254 |
| 6,115,580 | A | * | 9/2000  | Chuprun et al. ............... 455/1 |
| 6,192,230 | B1| * | 2/2001  | van Bokhorst et al. ..... 455/343 |
| 6,404,750 | B1| * | 6/2002  | Wicker et al. .............. 370/329 |

FOREIGN PATENT DOCUMENTS

| EP | 0903891 | 3/1999 |
| WO | 0051293 | 8/2000 |

OTHER PUBLICATIONS

Ramanathan et al., "Topology Control of Multihop Wireless Networks using Transmit Power Adjustment", InfoCom 2000, 19th Annual Joint Conference of the IEEE Computer and Communications Societies Proceedings, Tel Aviv, Israel, Mar., 2000, Vo 2, pp. 404–4.*

Yamazaki et al., "An Ad–hoc Routing Control Method in Sensor Networks", Industrial Electronics Society, 2000. IECON 2000 26th Annual con. Of the IEEE, Oct. 2000, vol. 2, pp. 1147–1152.*

Fine et al., "Sensor–Assisted ALOHA For Wireless Networks", International Symposium on IEEE Proceedings on Information Theory, p. 161.*

Carson et al., "Internet–Based Mobile Ad–hoc Networking", Internet Computing, IEEE, Jul. 1999, pp. 63–70.*

N. Bambos, "Toward Power–Sensitive Network Architectures in Wireless Communications: Concepts, Issues, and Design Aspects", IEEE Personal Communications Magazine, pp. 50–59, Jun. 1998.

(List continued on next page.)

*Primary Examiner*—Charles Appiah
(74) *Attorney, Agent, or Firm*—Tope-McKay & Associates (57) ABSTRACT

The present invention relates to power management within the context of wireless ad-hoc networks. More specifically to the effects of using different transmit powers on the average power consumption and end-to-end network throughput in a wireless ad-hoc environment. This power management approach reduces the system power consumption and thereby prolongs the battery life of mobile nodes. Furthermore, the invention improves the end-to-end network throughput as compared to other ad-hoc networks in which all mobile nodes use the same transmit power. The improvement is due to the achievement of a tradeoff between minimizing interference ranges, reduction in the average number of hops to reach a destination, reducing the probability of having isolated clusters, and reducing the average number of transmissions including retransmissions due to collisions. The present invention provides a network with better end-to-end throughput performance, and lower transmit power.

6 Claims, 9 Drawing Sheets

OTHER PUBLICATIONS

Carlos A. Pomalaza–Raez, "A Distributed Routing Algorithm for Multihop Packet Radio Networks with Uni– and Bi–directional Links", IEEE Transactions on Vehicular Technology, vol. 44, No. 3, Aug. 1995.

M. Corson and A.Ephremides, "A Distributed Routing Algorithm for Mobile Wireless Networks", Wireless Networks, vol. 1, pp. 61–81, 1995.

G. Foschini and Z. Miljanic, "A Simple Distributed Autonomous Power Control Algorithm and its Convergence", IEEE Transactions on Vehicular Technology, vol. 42, No. 4, Nov. 1993.

J. Broch et al., "A Performance Comparison of Multi–Hop Wireless Ad Hoc Network Routing Protocols", Proceedings of MOBICOM '98.

Adach, T., et al. "A Study on channel usage in a cellular ad–hoc united communication system for operational robots" IEICE Transactions on Comm., Institute of Electronics Information and Comm. Eng., Tokyo, JP, vol. E81–B, No. 7, Jul. 1 1998, pp. 1500–1506, XP000790184.

* cited by examiner

FIG. 1

| Node ID | Neighbor ID | Transmit Power Level |
|---|---|---|

FIG. 2: Signaling Packet Format

| Source ID | Destination ID | Current Node ID |
|---|---|---|
| Next Node ID | # of Re-Transmissions | Payload |

FIG. 3: Data Packet Format

| Node ID | Neighbor ID | Transmit Power Level |
|---------|-------------|----------------------|
| A | B | $P_1$ |
| A | C | $P_1$ |
| A | D | $P_1$ |
| B | A | $P_2$ |
| B | C | $P_2$ |
| B | E | $P_2$ |

Connectivity Table Format

Average Power Consumption (mW) v. Connectivity Range N

FIG. 8
Average Node Throughput v. Connectivity Range N

FIG. 9
End-to-End Network Throughput v. Connectivity Range N

FIG. 10

Average Power Consumption v. Connectivity Range N

POWER MANAGEMENT FOR THROUGHPUT ENHANCEMENT IN WIRELESS AD-HOC NETWORKS

TECHNICAL FIELD

This invention relates to power management within the context of wireless ad-hoc networks. More specifically, the invention relates to a power management scheme configured to reduce power consumption and enhance data throughput in wireless ad-hoc networks.

BACKGROUND OF THE INVENTION

Wireless communication between mobile nodes has become increasingly popular. There are essentially two techniques used for linking nodes in wireless networks. The first uses existing cellular networks, which are essentially systems of repeaters wherein the transmitting or originating node contacts a repeater and the repeater retransmits the signal to allow for reception at the destination node. The obvious drawbacks to the cellular systems include significant infrastructure costs and geographic limitations. Because of the significant infrastructure costs it is not practical to have cellular networks in all areas. Furthermore, in times of emergency, such as earthquake, fire, or power interruption the cellular network can become disabled in the precise location where it is needed most.

The second technique for linking nodes is to form a wireless ad-hoc network among all users within a limited geographical region. In this situation each user participating in the ad-hoc network should be capable of, and willing to, forward data packets and participate in ascertaining if the packet was delivered from the original source to the final destination. The wireless ad-hoc network has a number of advantages over cellular networks. First, the wireless ad-hoc network is more robust, in that it does not depend on a single node, but rather has a number of redundant, fault tolerant, nodes, each of which can replace or augment its nearest neighbor. Additionally, the ad-hoc network can change position and shape in real time.

Various routing algorithms have been proposed for wireless ad-hoc networks in the literature. These algorithms are mainly focused on establishing routes and maintaining these routes under frequent and unpredictable connectivity changes. The implicit assumption in most of the earlier work on routing protocols is that nodes' transmit powers are fixed. Power control is known in the context of cellular systems and satellite systems. Thus one drawback of the versatile ad-hoc network is power consumption. Conventional wireless ad-hoc networks have nodes that generally transmit at a single power level, regardless of the distance that the signal will traverse. Transmitting with too much power is costly in terms of node resources and can cause unwanted interference to nodes engaged in reception of other signals. Thus it would be desirable to have a power management scheme that reduces power consumption, enhances data throughput, and reduces demand for node resources traditionally allocated for data reception and transmission.

It is an object of the present invention is to provide both a method and apparatus configured to reduce power consumption, enhance data throughput, and reduce demand for node resources traditionally allocated for data reception and transmission.

SUMMARY OF THE INVENTION

Power based connectivity provides improved end-to-end network throughput, and simultaneously reduces power consumption. In wireless ad-hoc networks, as nodal transmitted power increases, the connectivity range also increases, consequently each node in the wireless ad-hoc network would reach almost all other nodes in a single hop. However, since higher powers cause higher interference levels, more collisions are likely to occur. By reducing the transmission power levels at each node such that the node can directly connect to only a small subset of nodes in the network, the interference zones may be significantly reduced.

The method and apparatus according to the present invention provides a system that dynamically reaches a near-optimal operating power level in a wireless ad-hoc network, such that the end-to-end throughput is optimized. In addition to optimizing end-to-end throughput the present invention permits a reduction in the total power usage. One of the major advantages provided by the present invention is conservation of power. Power is a particularly precious resource in the wireless environment. Typical wireless ad-hoc networks that might benefit from power based routing include low mobility wireless ad-hoc networks, including pedestrian networks formed by soldiers relaying situational awareness information on the battlefield, rescue workers and emergency disaster relief workers. The invention may also find application in a variety of sensor networks. Another object of the present invention is to provide a power management scheme that reduces power consumption, increases transmission range, enhances data throughput, and reduces demand for node resources traditionally allocated for data reception and transmission. The wireless ad-hoc network of the present invention uses only the minimum power required to contact a limited number of the nearest nodes, and consequently minimizes power requirements because transmission power requirements are reduced. Furthermore, transmission range can be greater than that found in a network where the signals are not relayed.

DETAILED DESCRIPTION OF THE PREFERRED EMBODIMENTS

The present invention provides a method and an apparatus useful for enhancing end-to-end network throughput, while simultaneously reducing power consumption, and may be tailored to a variety of other applications. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, with the express clarification that as this is specifically an example, no restrictive or exclusive character should be assigned to it, its purport being merely illustrative of the fundamental concept on which it is based.

Power based connectivity provides improved end-to-end network throughput, and simultaneously reduces power consumption. In wireless ad-hoc networks, as nodal transmitted power increases, the connectivity range also increases, and consequently each node in the wireless ad-hoc network would reach almost all other nodes in a single hop. However, since higher powers cause higher interference levels, more collisions are likely to occur. By reducing the transmission power levels at each node such that the node can directly connect to only a small subset of nodes in the network, the interference zones may be significantly reduced. Under this proposition, a packet has to be relayed by many intermediate nodes before it reaches its final destination. Since this may result in a large number of transmissions, and hence, an increase in interference, throughput may again be degraded.

The present invention provides a method and an apparatus that dynamically reaches a near-optimal operating power level, such that the end-to-end throughput is optimized. In addition to optimizing end-to-end throughput the present invention permits a reduction in the total power usage, to a level close to the minimum. One of the major advantages provided by the present invention is conservation of power. Power is a particularly precious resource in the wireless environment. Typical wireless ad-hoc networks that might benefit from power based routing include low mobility wireless ad-hoc networks, including pedestrian networks formed by soldiers relaying situational awareness information on the battlefield, rescue workers and emergency disaster relief workers. The invention may also find application in a variety of sensor networks.

The present invention provides a power management scheme that can be utilized in conjunction with traditional table-driven routing protocols, with possibly minor modifications to the protocols themselves. The performance measures are taken to be the end-to-end network throughput and the average power consumption.

I. System Model

Figure 1:
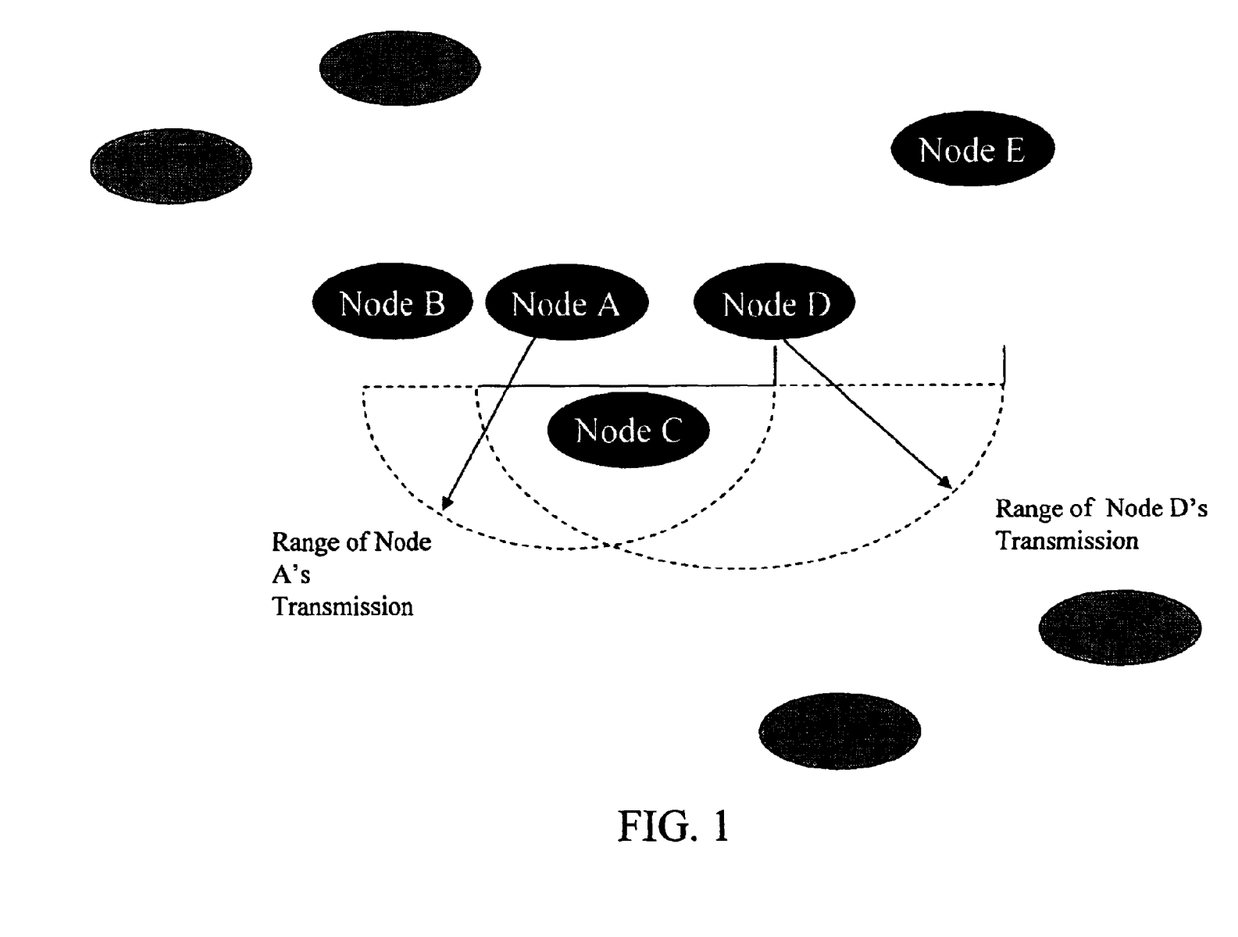
FIG. 1 shows a power-controlled ad-hoc network.

When the power management scheme according to the present invention is implemented, each node transmits at a power level such that only a fixed number of neighboring nodes can distinguish the transmission. For example, a node might transmit with a power such that only its three closest neighbors can hear its transmission. Thus, in FIG. 1, node A transmits with a power such that only its three nearest neighbors i.e., nodes B, C and D can distinguish the transmission. Similarly, node D would transmit with a different power, say, such that only it's three nearest neighbors i.e., nodes A, C and E can hear the transmission.

In order to set up the framework to investigate the effect of transmit powers on the end to-end network throughput, it is helpful make a few assumptions and introduce some notations that will appear herein. The wireless ad-hoc network, for the purposes of this invention, will be assumed to be comprised of n nodes, wherein each node has a unique ID denoted by Node ID. The number of nodes, n, may be dynamically shifting as nodes enter and leave the wireless ad-hoc network. The mobile nodes are assumed to have low mobility patterns relative to one another, for instance, nodes traveling in a manner such that changes in inter-nodal reception vary slowly as a function of time. Such a low mobility pattern would result when the network nodes are carried by pedestrians. The low mobility pattern, in turn, implies that the network topology changes occur slowly; and consequently a class of shortest-path routing algorithms are generally applicable in such a scenario. Additionally each mobile node has a transmittance power that allows for direct connectivity only to each node's N closest neighbors, where N may be adapted dynamically. For the purposes of this invention it will be assumed that the type of traffic to be handled is significantly connectionless (datagrams), i.e., routing decisions are made on a packet-by-packet-basis. Further, the transmit power of any mobile node is upper bounded by a maximum power level, $P_{max}$, where $P_{max}$ is constrained by the limited size and weight inherent in mobile terminals. Further, the transmit power of any mobile node has a lower, minimum power, boundary level $P_{min}$. This constraint is essential as a means of reducing the possibility of partitioning the network into isolated islands. Two MAC schemes are deployed in this system. First, a contention-free MAC scheme is employed for signaling, and second, a classical Slotted-Aloha MAC scheme is employed for data transfer. It should be understood that any contention-based scheme that provides acceptable results could be selected. Additionally, the invention assumes the availability of a reliable reverse channel that, preferably, operates in a different frequency band. This channel is essential for sending acknowledgement, or ACK, messages from the receiving node to the transmitting node in order to enable retransmission when required. The determination relating to when retransmission is appropriate can be based on an interval of time when no packets are forthcoming, but one or more was expected. Such "time-outs" are set at the transmitting node to detect if packets were involved in collisions or otherwise lost. In the general case the data packet will reach its destination successfully, and upon successful reception, the destination node is expected to broadcast an acknowledgement message, at optionally the maximum allowable power level, $P_{max}$, in order to reach the source node directly. This acknowledgement enables each node to periodically compute its end-to-end throughput that is to be optimized. The protocols will use this computation in order to drive the average throughput towards a maximal value.

Guard bands are crucial in order to keep the nodes in the network time-synchronized. The guard band provides a time interval in excess of that required to the receive data. The guard bands provide a margin of safety against time domain variations in sequential operations. More specifically, the slot duration is intentionally made larger than packet duration by a time interval equal to a guard band. These guard bands are configured to compensate for arbitrary delays incurred by transmitted packets due to signal propagation delays, clock drifts or other time discontinuities.

It is assumed that each mobile node has two buffers. First is a Medium Access Control, MAC, Buffer, which is configured to store packets arriving during a time slot until the beginning of the next time slot. When the MAC Buffer is full, packets are dropped and they are treated as lost packets. Second is a Retransmission Buffer that temporarily stores transmitted packets, until the Retransmission Buffer receives a message from the next node. If it receives an acknowledge, ACK, message, meaning that the packet was successfully delivered, then the retransmission buffer discards the packet. Alternatively, if the ACK message is not forthcoming before the buffer times out, the buffer concludes that the packet was lost, and the packet is retransmitted after a period of time.

While a variety of path routing algorithms are compatible with the present invention, one embodiment includes the use of a classical shortest-path routing algorithm well known in the art as the Bellman Ford algorithm. The algorithm is slightly modified to comport with the unique characteristics inherent in the novel link cost calculations. In this embodiment the link costs are chosen to be the transmitted powers. Therefore, the objective is to route the packet from the source to the destination through the minimum power path. Other embodiments may compute link costs using an optimal combination of transmitted powers and other factors.

Each node in the wireless ad-hoc network is equipped with a squelch circuit, wherein the squelch circuit requires that the received signal power be greater than a minimum power level, MinRecvPower. The squelch circuit is configured to suppress spurious noise and excessively weak signals. Such a circuit is helpful as a means for guaranteeing reliable communication between the transmitter and the receiver. The value of MinRecvPower helps determine the power level at which a mobile node has to transmit in order to directly reach a neighboring node.

It is expected that unidirectional links will be formed when transmit powers are thus manipulated, i.e., there might be a cluster of nodes that can communicate with each other but no packets can either enter or leave this cluster. This does not change the routing methodology, i.e., table routing is still feasible, since the signaling channel is bi-directional.

Figure 2:
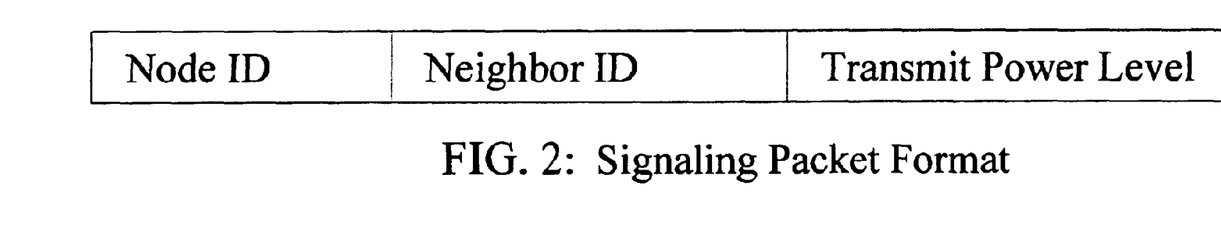
FIG. 2 shows the format of a signaling packet.

The Signaling Packet format is shown in FIG. 2, wherein the Node ID is the identifier for the node broadcasting the signaling packet; and wherein the Neighbor ID is the identifier for a direct neighbor to which the node is broadcasting the signaling packet; and wherein the Transmit Power Level is the minimum power level needed to reach that neighbor.

Figure 3:
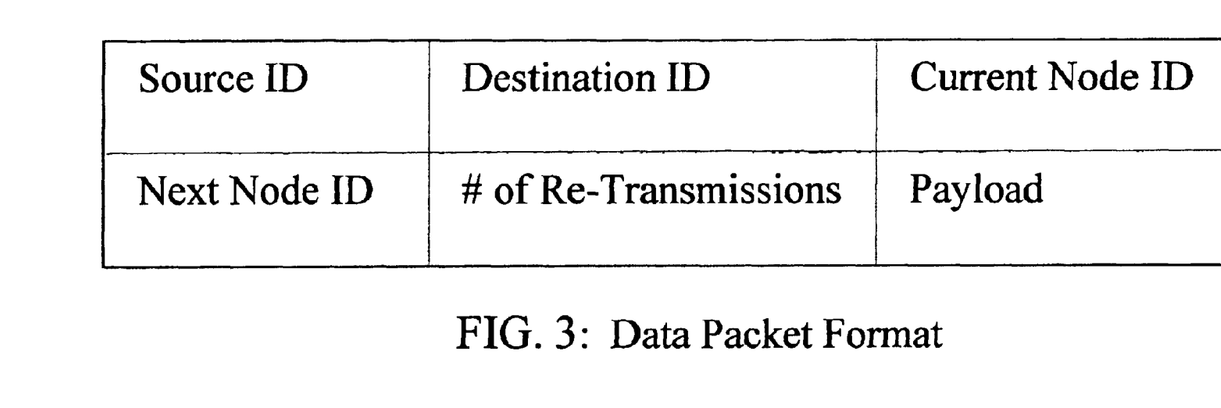
FIG. 3 depicts the typical format of a data packet.
Figure 4:
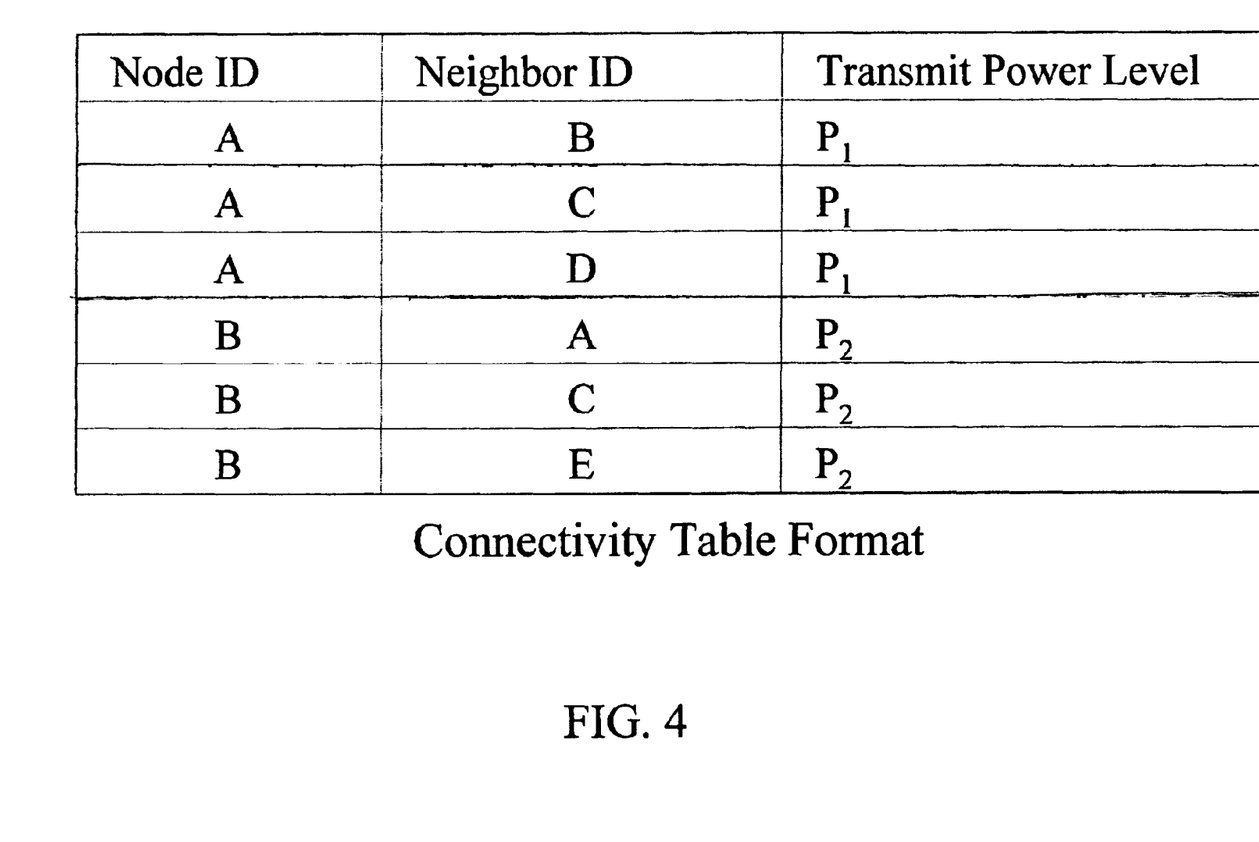
FIG. 4 shows the typical format of a connectivity table.

The Data Packet format is shown in FIG. 3, and the following definitions hold; the "Source ID" is the identifier of the node that generated the packet, and the "Destination ID" is the identifier of the packet's destination node. The "Current Node ID" is the identifier of the relay node at which the packet is currently stored on its path to the destination. The "Next Node ID" Identifies of the next relay node to which the packet is to be transmitted on its path to the destination. The "#Re-Transmissions" represent the total number of re-transmission attempts performed on that packet. Retransmission will be necessary whenever a packet encounters a collision or otherwise must be retransmitted. The Connectivity Table, for the wireless ad-hoc network shown in FIG. 1, will have the format shown in FIG. 4.

For the purposes of the invention, Node Throughput is defined as the percentage of successful transmission attempts and End-to-End Network Throughput is defined as the percentage of packets that reach their destinations successfully and is denoted by $\eta$. Further, the Average Power Consumption is defined as the average transmitted power/node/slot and is denoted by $\overline{P}$. Further, for the present invention the channel model includes only path loss and shadowing effects.

II. Connectivity Range Optimization

There are essentially three models under which wireless ad-hoc networks operate. First, consider a wireless ad-hoc network with all mobile nodes using the maximum power level at all times, i.e., no power management. This is commonly used. In this model, any mobile node can reach a large number of nodes in just one hop. The advantage of this approach is reaching a large number of nodes in a single hop and perhaps, almost all of the nodes in the network in two hops. The price paid is however twofold, namely a high power consumption and a higher level of interference, which results in a large number of unsuccessful transmissions. If the link cost is taken to be the transmitted power, the cost of all the links are equal and are equal to $P_{max}$. Hence the minimum power routing reduces to minimum hop routing.

The second model includes a wireless ad-hoc network, consisting of n nodes, each with a connectivity range of N, where $2 \leq N < n-1$. Each mobile node has a direct link to the closest N nodes out of (n-1) mobile nodes. We call such a group of N nodes a "cluster". Given N, the mobile node adjusts its power to reach, at most the farthest node within its cluster. However, assume that there is no power adaptation within the cluster. The advantages of this approach are lower power consumption per transmission. Furthermore, a node's transmission will cause lower interference to other simultaneous transmissions when compared to the previous case. The drawbacks are that a higher number of hops might have to be traversed in order to reach a destination, and there exists the possibility of having isolated clusters. Note that link costs calculated in terms of transmitted powers are generally different depending on the radius of each cluster. Accordingly, incorporating the minimum power routing algorithm is crucial to limit power consumption. The limitation of this model relates to the absence of power adaptation within a cluster. Because of this lack of power adaptation it is possible that a mobile node communicates with a node within its cluster using a power level higher than the minimum required power to communicate with that node, and thereby possibly introduces more interference than that incurred in the case to be discussed in conjunction with the third model.

The third model pertains to a wireless ad-hoc network with each node having a connectivity of N, where $2 \leq N < n-1$. Again, each mobile node has a direct link to the closest N (out of (n-1)) mobile nodes. Assume that in this case there is power adaptation within the cluster. This approach, intra-cluster power adaptation, reduces the power consumed on various routes. Thus, in order to communicate with another node, a node would use the minimum power that guarantees reliable communication with that node. Note that this approach would minimize the interference caused by a transmission. The advantages and drawbacks are the same as in the second model. This model achieves higher throughput than the previous models at the expense of higher complexity. The minimum power routing is once again the candidate routing algorithm.

In the case of the intra cluster power adaptation according to the third model, the objective is to solve the following minimization equation:

$$\min_{N} (-\eta + \alpha \cdot \overline{P})$$

s.t.

$$P_{min} \leq P_{ti} \leq P_{max} \qquad \text{Eqn.(1)}$$

Where,

N is the number of nodes within the cluster;

$\eta$ is the end-to-end network throughput;

$\alpha$ is the fixed weighting factor that reflects the relative importance of the two components of the composite cost function. The choice of the parameter α is rather arbitrary, and there is no well-defined procedure for choosing it;

$\overline{P}$ is the average power consumption and is defined as the average transmitted power/node/slot;

$P_{min}$ is the minimum power boundary, below which no node can transmit $P_{ti}$ is the transmitted power of node i; and $P_{max}$ is the maximum power boundary, above which no node can transmit.

The following formulation is equivalent and much easier to implement, $$\min_N \eta$$

s.t.

$$\overline{P} \leq \beta$$
$$P_{min} \leq P_{ti} \leq P_{max} \qquad \text{Eqn (2)}$$

Where β is equivalent to the α parameter and has a one-to-one correspondence to α.

In operation each mobile node is responsible for keeping track of its closest neighbors. This is done by measuring signal strength, or alternatively the attenuation of $P_{max}$ transmissions. Each mobile node updates its local connectivity tables according to the signal strength of its nearest neighbors. Location updates have to be frequently exchanged so as to accurately track topology changes. Briefly the functions performed at each mobile node as follows:

1. Each mobile node is assigned a dedicated signaling time slot of a global signaling channel. In this slot, the node is allowed to broadcast a beacon packet, using the power level $P_{max}$, to all other nodes in the area of interest. Note that the MAC protocol employed for signaling supports contention-free communications, and hence no collisions occur in this phase.
2. In slot i, all other nodes obtain the beacon signal of node i. Accordingly, they record the received power level and store it in a data structure along with the transmitting mobile node's ID. This functionality is simulated in a model using the Power Measurement procedure described herein. Using a set consisting of the latest, predetermined number of received power level measurements, an average is computed. Note that average power measurements are used, rather than instantaneous power measurements. This is motivated by the fact that average power measurements smooth out variations due to fast multi-path fading, which is not compensated for by this scheme.
3. By the end of this phase, mobile node i, $1 \leq i \leq n$, is expected to have a ranking of all other nodes and this ranking is based on the average received power levels from those nodes. Based on this ranking, node i picks its N closest nodes, specifically those having highest average received power levels at this node's site, as its direct neighbors. Subsequently, node i updates its local connectivity table by adding the mobile node IDs of its direct neighbors.
4. Each node then adapts its transmit power level in order to achieve the required connectivity, i.e., direct links are established only to the closest N nodes.
5. Node i updates its local connectivity table to reflect the link costs to the direct neighbors. The link cost in this protocol is taken to be the transmit power level.
6. Each node then broadcasts a Signaling Packet containing its local connectivity table information in the signaling channel. Thus, each mobile node obtains and then stores the global network topology information. This information is then used in forming its local routing table. Note that a global topological view is essential for the functioning of the table-driven routing algorithms. For large networks, it is not feasible for each node to store the entire global topological information due to the heavy communication overhead incurred and also due to memory constraints. Accordingly, this scheme supports small to mid-size wireless ad-hoc networks or sub-networks of a large ad-hoc network.

In the area of power measurement, the present invention provides a procedure that emulates the operation of mobile node j capturing the beacon signal transmitted by node i during node i's allocated signaling slot, where $1 \leq i,j \leq n$ and i is not equal to j. The received signal strength depends solely on the transmitted power level, which is assumed to be $P_{max}$ during this phase, the current positions of nodes i and j, and the effect of the log-normal shadowing. Thus, the received power level is computed by using the following formula:

$$P_{rji} = \frac{\zeta}{d_{ji}^4} \cdot P_{ti} \qquad \text{Eqn. (3)}$$

where, $P_{rji}$=received power level at node j from node i $P_{ti}$=transmitted power by node i.

$d_{ji}$=current distance between node j and node i.

$\zeta$=log-normal shadowing coefficient.

As pointed out earlier, average power measurements are relied on rather than instantaneous power measurements, because instantaneous measurements may be inaccurate in reflecting the slowly varying channel conditions in the presence of fast multi-path fading. Therefore, a moving average is computed by each node to average out the fast fading over a pre-specified number of most recent instantaneous power measurements.

The present invention provides two approaches to power management in mobile ad-hoc networks; the first provides no power adjustment within a cluster while the second does provide for power adjustment within a cluster. The basic difference between the two schemes is that in the former scheme, the power needed to communicate with the farthest node in the cluster is also used to communicate with any closer node in the cluster. On the other hand, the latter scheme suggests communicating with each node using the minimum power it needs for reliable communication. This introduces less interference to simultaneous transmissions of other nodes.

The objective of defining a cluster is to reduce collisions and interference and thereby improve the end-to-end network throughput. Assume a minimum required level of received power, denoted MinRecvPower, which is necessary to guarantee a maximum acceptable bit error rate. The minimum power level to be used for transmission by node i such that at least the MinRecvPower level is achieved at node j for a given network configuration is given by:

$$P_{tij} = P_{max} \cdot \frac{MinRecvPower}{P_{rji}} \qquad \text{Eqn. (4)}$$

where, $P_{tij}$=power transmitted by node i such that the transmission range does not exceed beyond node j's coordinates.

$P_{rji}$=power received by node j when node i transmits at $P_{max}$ for the given configuration.

The Minimum Power Routing (MPR) algorithm according to the present invention is a hop-by-hop shortest path routing mechanism where the link costs are the transmitted power levels. The routing algorithm then goes through the following steps:

1. Based on the routing table constructed, create the set of all possible routes from the source to destination.
2. Search, within the created route set, for the minimum cost route from source to destination.
3. Determine the next relay node on the minimum power route.
4. Modify the Next Node ID field in the data packet being routed.
5. Copy the packet to the retransmission buffer until its successful reception at the next node is indicated via an ACK message.
6. Send the packet to the MAC module for transmission to the next relay node.

The power management based routing is recommended for networks characterized by low mobility patterns, especially nodes having movement patterns approximating those of pedestrians. The position of each node is updated periodically, with a predetermined period. The new position is determined using the current position coordinates, the speed of the mobile node, and the direction of motion. The speed of the mobile node is drawn from a random variable, uniformly distributed between minimum and maximum values. Moreover, the direction of motion is assumed to be uniformly distributed in $[0, 2\pi]$.

III. Simulation Results

Data from simulation models for a wireless ad-hoc network that consists of 25 nodes is presented herein. The value of $P_{max}$ was selected such that the transmission range of any node using $P_{max}$ spans at least 15 out of the 25 nodes in the network. Therefore, the connectivity range N was limited to take values between 2 and 15 as reflected in Table 1. The threshold MinRecvPower is 1 milliwatt. This is sufficient to guarantee a minimum acceptable bit error rate at the receiver. Note from Table 1 that the mobility model parameters reflect the low mobility pattern being considered.

TABLE 1

| System Parameters | |
| --- | --- |
| n | 25 nodes |
| N | 2, 3, 4, . . . ,15 |
| $P_{max}$ | 100 mw |
| MinRecvPower | 1 mw |
| Packet Arrival Rate/node | 0.05, 0.1 ,0.2 pkts/sec |
| Frame Duration | 25 msec |
| Slot Duration | 2 msec |
| Minimum Speed | 1 m/sec |

TABLE 1-continued

| System Parameters | |
| --- | --- |
| Maximum Speed | 5 m/sec |
| Time between location updates | 10 sec |
| Simulation Time | 800 sec |

Figure 5:
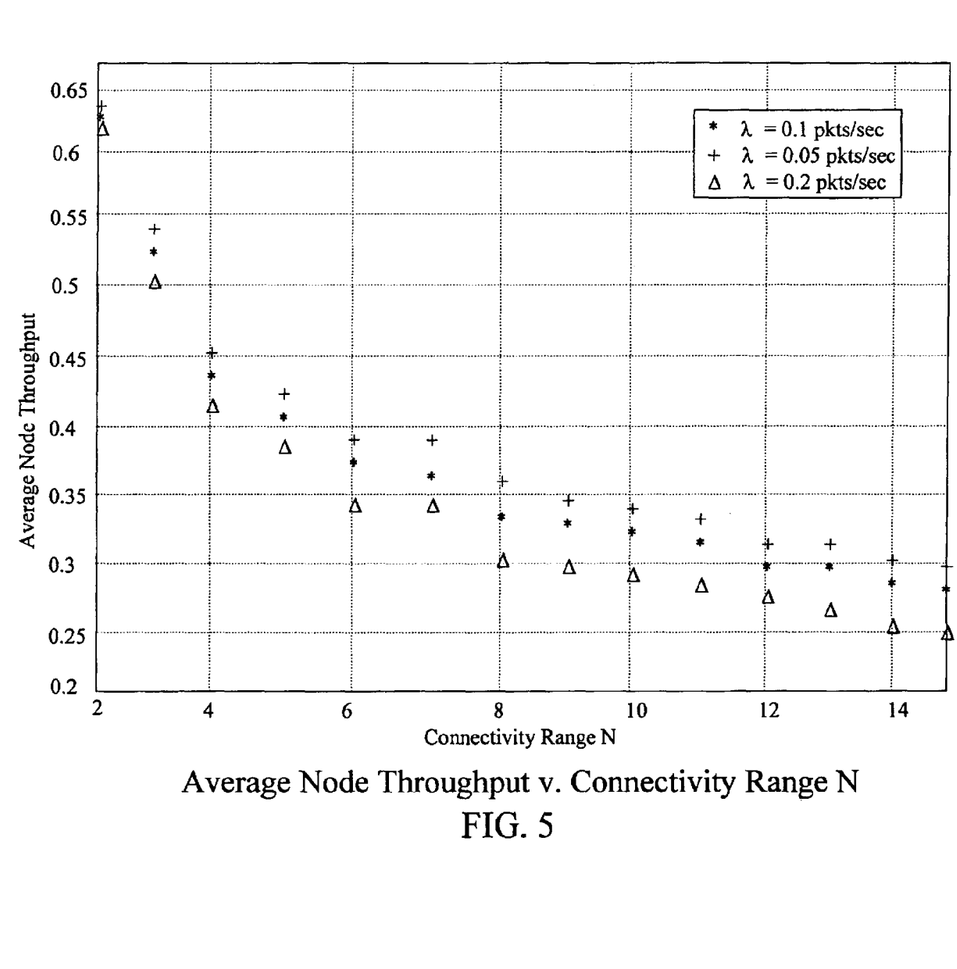
FIG. 5 illustrates the average node throughput as a function of connectivity range, N.
Figure 6:
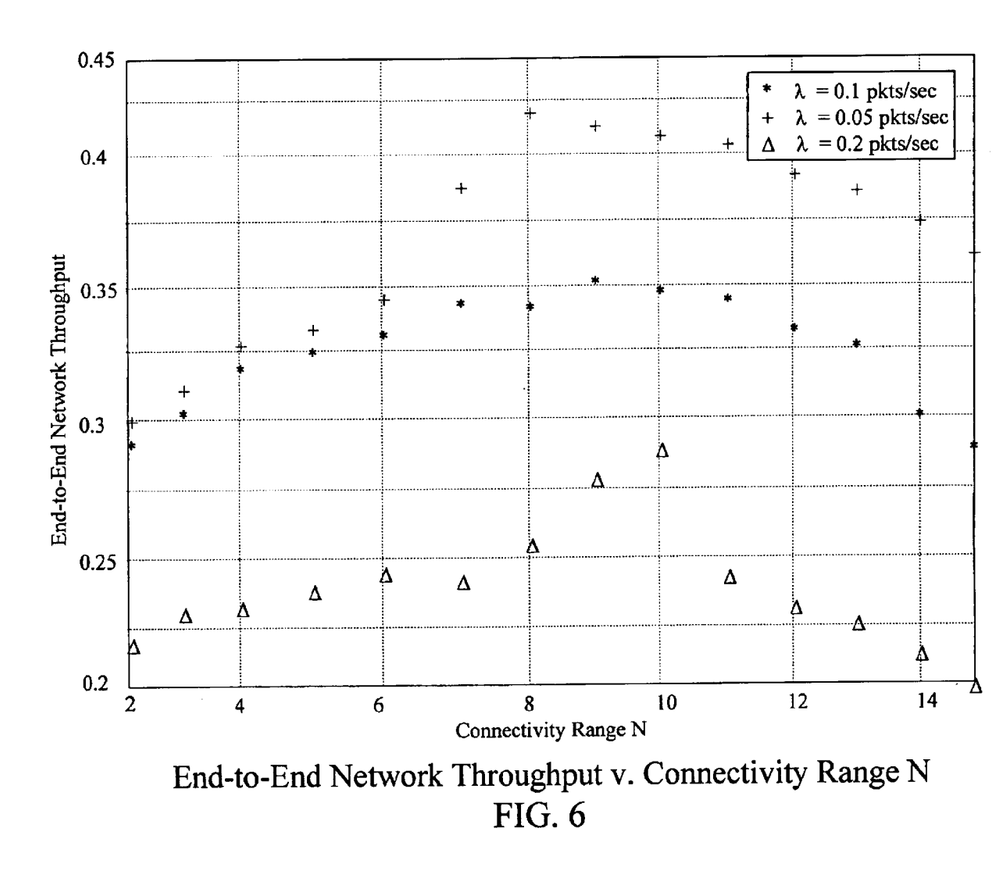
FIG. 6 shows the end-to-end network throughput as a function of connectivity range, N.
Figure 7:
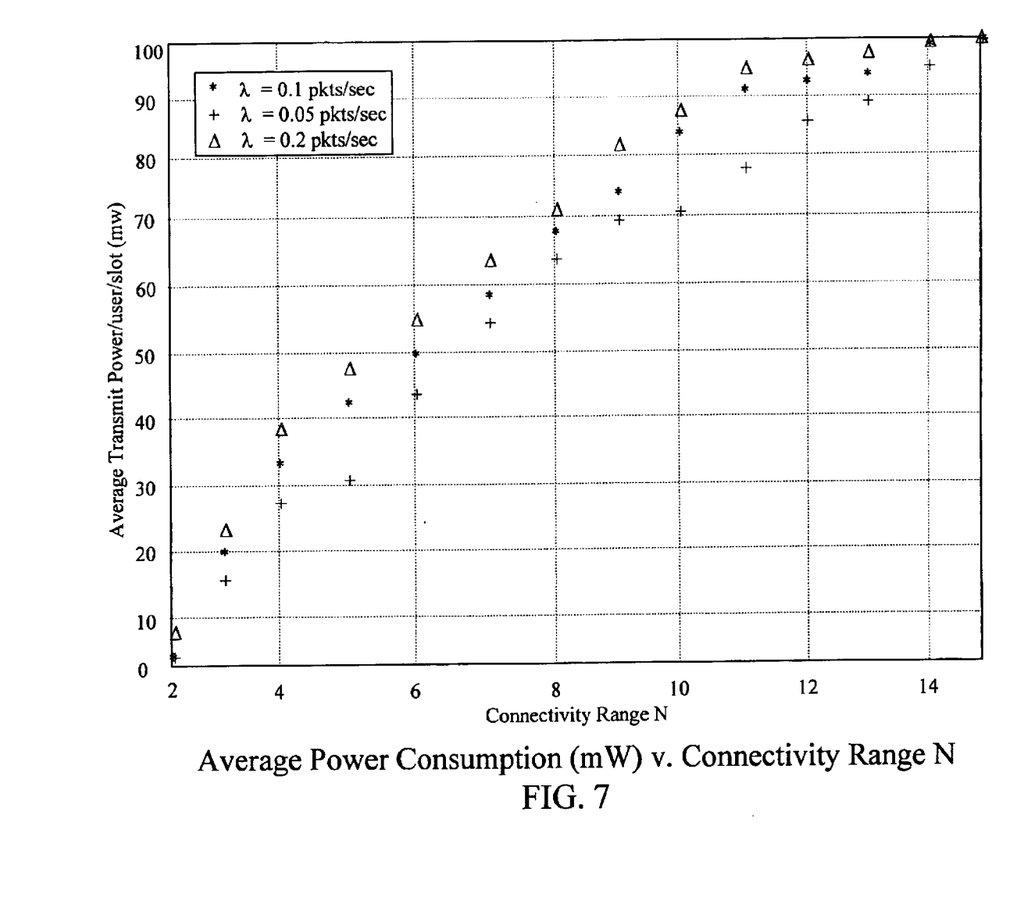
FIG. 7 shows average power consumption as a function of connectivity range, N.

The data in this section illustrates the impact of manipulating the Connectivity Range N on the end-to-end network throughput and on the average power consumption. First consider the "no power adjustment within a cluster" approach. In FIG. 5, the average node throughput is plotted versus N for different network loads. It should be noted that the average node throughput decreases as the connectivity range, N, increases. Note that when N increases, more nodes, whose transmissions interfere, compete for transmitting in the same time slot, and hence collisions become more likely. However, when N increases, packets are expected to make fewer hops before reaching their destination, which implies that fewer intermediate nodes attempt transmissions in the same slot. The results indicate that the advantage gained by the latter effect does not offset the disadvantage of the increased interference and collisions due to the former effect. Destination IDs were generated according to a uniform distribution. This, in turn, reduced the effect of the second factor, since the number of hops traversed from source to destination depends mainly on the distance between those nodes. Thus, the first factor may be expected to dominate the behavior of the node throughput as N increases. On the other hand, if the Destination node was restricted to be sufficiently far from the source node, the contribution of the second factor would be more, and in this scenario, it would offset the first factor. In FIG. 6, the end-to-end network throughput is shown for different network loads. Notice that the throughput achieved is relatively low due to the underlying slotted Aloha MAC protocol. However, the results are useful in comparing various design alternatives that provide insight about various tradeoffs. It should be noted that the maximum end-to-end throughput is achieved for values of N less than 15, which corresponds to the no power management case. This implies that including a transmit power control/management scheme in a wireless ad-hoc environment improves the network throughput. In FIG. 7, the average power consumption is plotted versus N for different network loads. The average power consumption increases monotonically as N increases. Again, this can be explained due to the aforementioned opposing factors affecting the average node throughput. As in the case of the node throughput, as N increases, the first factor dominates the average power consumption behavior.

The trade-offs between end-to-end throughput and average power consumption are depicted in FIG. 6 and FIG. 7. Consider the case where $\lambda$ is 0.1 packets/sec. For $2 \leq N \leq 9$, it is noteworthy that in order to reduce average power consumption, the end-to-end throughput has to be sacrificed. In equation 3, if $P_{av} \leq 53$ mW, it is seen from FIG. 6 that the maximum achievable end-to-end network throughput is 0.32. This is for the particular value of the packet arrival rate, in this case 0.1 packets/sec. The same trends are preserved for a variety of network loads. Note that by definition, the end-to-end throughput is the percentage of the total transmitted packets that actually reach their destinations. This definition of throughput is different from the traditional definitions of throughput for slotted aloha systems.

Figure 8:
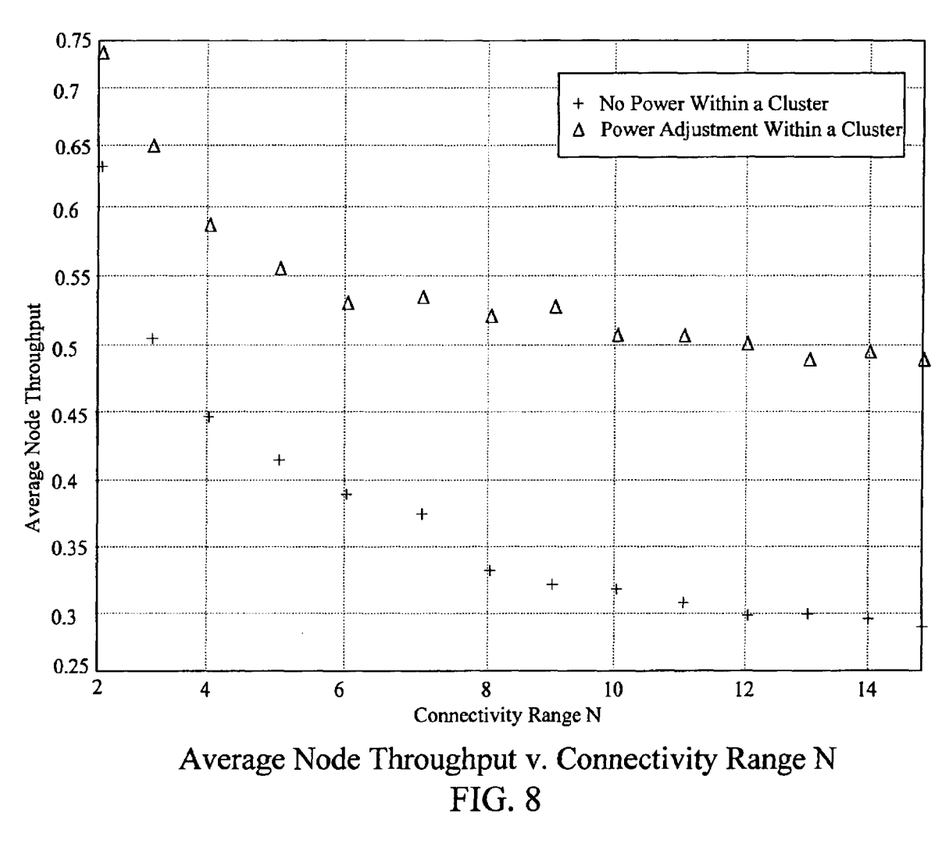
FIG. 8 shows average node throughput as a function of connectivity range, N.
Figure 9:
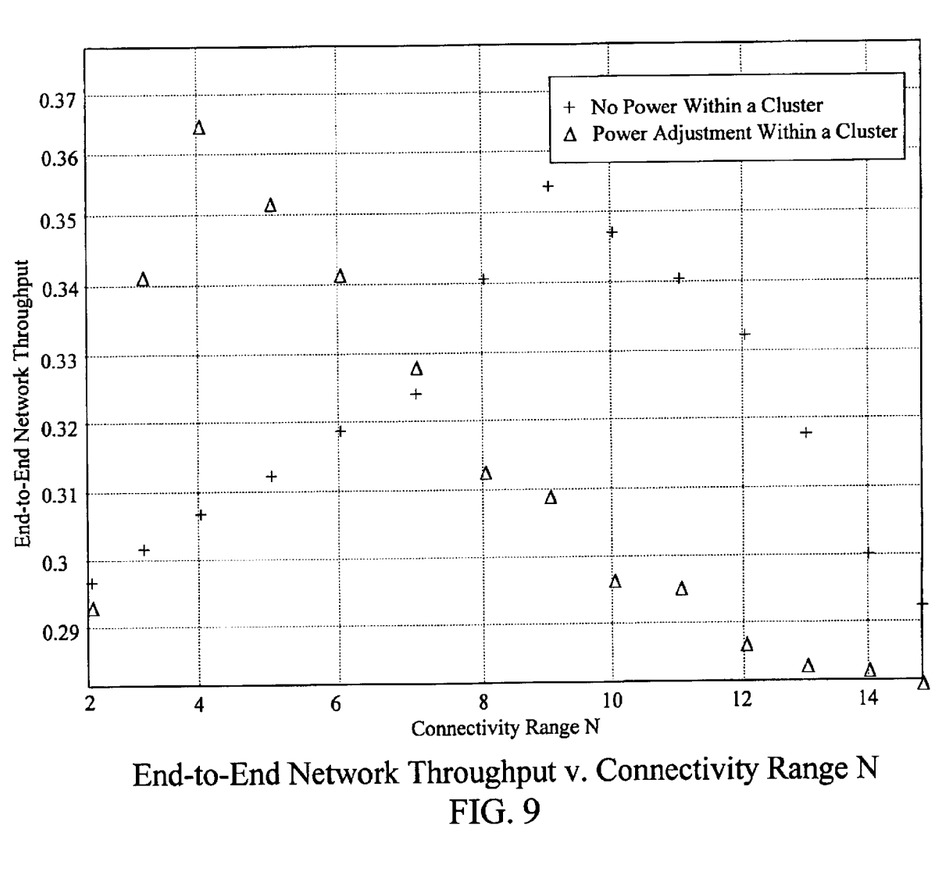
FIG. 9 depicts end-to-end network throughput as a function of connectivity range, N.
Figure 10:
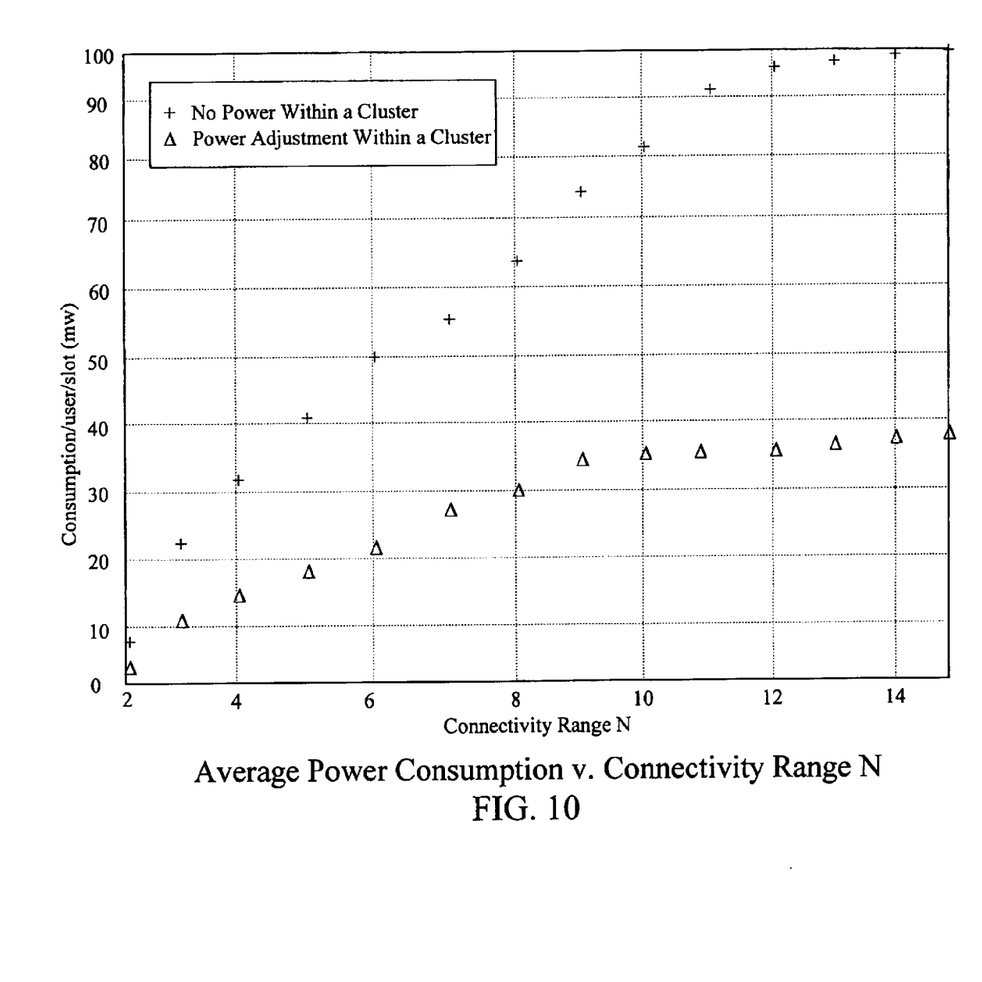
FIG. 10 shows average power consumption per user, per slot, in mW as a function of connectivity range, N.

Next consider the "power adjustment within a cluster" approach. As explained earlier, each node can communicate with any other node if the power at the receiving node is larger than the minimum received power needed for reliable communication. Therefore, this approach is expected to reduce the interference and hence improve the average node throughput as shown in FIG. 8. The similarity of the trends in average node throughput under both approaches of power management is shown in FIG. 8. FIG. 9 shows the end-to-end network throughput under the two proposed approaches for power management. It is evident that the trends are substantially similar for both approaches. Moreover, it is worth noting that in the "power adjustment within a cluster" approach, the maximum throughput is achieved at a different connectivity range, i.e., at N=4. In addition, at higher connectivity ranges, the "no power adjustment within a cluster" approach exhibits superior results. This is mainly due to the fact that in the approach which includes power adjustment within a cluster, minimum power routes to destinations have a tendency to consist of a larger number of hops than in the case when the scheme with no power adjustment within the cluster is deployed. This effect becomes more conspicuous for large values of N. Finally, notice from FIG. 10 that the behavior of the average power consumption has the same trend under the two power management approaches.

The power consumption is lower when the second approach is used, since direct neighbors communicate using the minimum power needed for reliable communication. Hence, the second power management approach outperforms the first in terms of power savings and end-to-end throughput. Note that at the optimal operating point, in terms of end-to-end throughput, the second power management scheme offers an average power saving of 60 mW. The consumed power in the second scheme is 15 mW as opposed to 75 mW in the case of the first scheme.

Possible protocol implementations include at least two protocols that enable each node to dynamically adapt the connectivity range parameter N in order to achieve a near-optimal operating point. The first such protocol is a Periodic Update Protocol, this protocol follows the following steps:

1. Initially, each node independently chooses its connectivity range to be the minimum i.e., the range N is set to 2.
2. The node operates for a pre-specified number of frames (k) with this chosen value of N.
3. By the end of this period (called the checkpoint), the performance measure, namely the end-to-end throughput of this node, is computed.
4. At this checkpoint, each node broadcasts its end-to-end throughput on the reverse channel. This is essential for each node to compute the average end-to-end network throughput. This value is then stored in a data structure denoted by $\eta_N$.
5. The connectivity range is then increased by one, i.e. N is increased by one. The ad-hoc system is expected to operate using this connectivity range for the next k frames.
6. At the next checkpoint, the new value of the average end-to-end network throughput is computed and stored in a data structure denoted $\eta_N$.
7. Compare $\eta_{N-1}$ to $\eta_N$. One of the following two cases might arise:
   If ($\eta_N > \eta_{N-1}$) then increase the connectivity range to N+1 and go to step 6.
   Else
   reduce the connectivity range to N−1 and go to step 6.
8. As long as the average end-to-end network throughput increases with N, N will be increased. This is done until the throughput starts decreasing with N, at some value of N, say at N=i+1. This implies that a maximum in the throughput is achieved at N=i, which is the connectivity range that achieves the maximum end-to-end network throughput for the current network configuration.
9. At each check point, compare the end-to-end network throughput with the throughputs achieved when N=i+1 and N=i−1. As long as $\eta_i > \eta_i+1$, and $\eta_i > \eta_i-1$, N need not be changed.
10. If the network configuration changes at some later time, such that this connectivity range N=i does not achieve the maximum throughput anymore, then pick any of the two neighboring points, or $\eta_i+1$ or $\eta_i-1$, that achieves a higher throughput.
11. If N=i+1 achieves a higher throughput, then further increase N in order to search for the new maximum. Go to step 6.
12. If N=i−1 achieves a higher throughput, then we further decrease N in order to search for the new maximum. Go to step 6.

The second possible protocol is a Quasi-Periodic Update Protocol. This protocol is identical to the Periodic Update Protocol except that, when the network achieves maximum end-to-end throughput, the algorithm less frequently attempts to test if the current connectivity range is the optimal. The algorithm takes advantage of the fact that the network under consideration consists of nodes of low mobility, i.e. the network topology changes slowly. Therefore, once the system reaches an operating point wherein the throughput is at a maximum, the algorithm expects the throughput to stay at the maximum or at a value very close to the maximum until the topology changes drastically. Therefore, this algorithm trades simplicity for performance. It is much simpler than the Periodic Update protocol, but there is a possible degradation in the end-to-end network throughput.

This invention provides a method and apparatus for power management in wireless ad-hoc networks. The objective is maximize throughput while minimizing the average power consumption. Essentially there are two configurations. First is the concept of clusters wherein a node adapts its transmit power so as to establish connectivity with only a limited number of neighborhood nodes. Within its cluster the node might wish to adapt power to communicate with different nodes, or it might use the same power to communicate with all nodes within the cluster. The former scheme performs better in terms of achieving a lower average power consumption and a higher end to end throughput. Simulations further show that both schemes help improve performance in terms of reducing average power consumption and end to end throughput. Thus, a network with a power management scheme implemented will have better performance than a network without such a scheme. It is envisioned that the invention has application wherein each mobile node has a different connectivity range.

What is claimed is:

1. A method for improving end-to-end network data throughput in wireless ad hoc networks by optimizing transmitter output power, comprising the steps of:
   a. setting the transmittance power of a first node such that the transmittance power is sufficient only to contact said first node's closest neighboring nodes;
   b. operating the node for a pre-specified period of time;
   c. computing end-to-end network throughput of said node when said pre-specified period of time has elapsed, and storing a first value, $\eta_{N-1}$;

d. increasing the transmittance power of said first node such that a connectivity range includes at least one additional node;
e. operating the node for a pre-specified period of time;
f. computing a new value of the average end-to-end network throughput and storing this second value, $\eta_N$;
g. comparing said first value to said second value
  i. if($\eta_N > \eta_{N-1}$) then increase the transmittance power such that the connectivity range to includes at least one additional node and go to step h;
  ii. else reduce the transmittance power and connectivity range to exclude at least one node, and go to step h;
h. comparing, at each pre-specified period of time, the end-to-end network throughput with the throughputs achieving greater and lesser transmittance power, and so long as the existing power level provides results that are superior to those obtained with greater or lesser transmittance power, not changing the transmittance power;
i. periodically determining if a greater transmittance power achieves a higher throughput, then further increasing the transmittance power in order to discover a new maximum throughput;
j. going to step h.

2. The method for improving end-to-end network data throughput in wireless ad hoc networks of claim 1 wherein the pre-specified period of time may be varied depending on movement patterns of the wireless ad-hoc network.

3. The method for improving end-to-end network data throughput in wireless ad hoc networks of claim 1 wherein the pre-specified period of time is specified remotely.

4. The method for improving end-to-end network data throughput in wireless ad hoc networks of claim 1 wherein the pre-specified period of time is vanishingly small.

5. The method for improving end-to-end network data throughput in wireless ad hoc networks of claim 1 wherein a full range of transmittance powers are initially tested so as to minimize the possibility of selecting a local extreme.

6. The method of optimizing power consumption in a network, the network having a first node, a second node, and a third node, the method comprising steps of:

sending a beacon signal from the first node at a known transmit power;

measuring a received power level of the beacon signal at the second node;

calculating an optimum transmit power from the second node to the first node based upon the known transmit power and the received power level of the beacon;

utilizing the optimum transmit power when sending data from the second node to the first node;

transmitting a second beacon signal from the third node at a known transmit power level;

measuring a received power level of the second beacon signal at the second node;

ranking, by the second node, the first and third nodes based upon the received power level of the beacon signal from the first node and the received power level of the second beacon signal from the third node; and picking a closest node based upon the step of ranking.

* * * * *